United States Patent
Cochran

[15] 3,653,195
[45] Apr. 4, 1972

[54] METHOD AND APPARATUS FOR HARVESTING FRUIT

[72] Inventor: Tatum R. Cochran, Fort Meade, Fla.

[73] Assignees: Robert W. Loadholtes; Loyd C. Shirley, , part interest to each

[22] Filed: Feb. 13, 1970

[21] Appl. No.: 11,190

[52] U.S. Cl. .......................................................... 56/328 R
[51] Int. Cl. ............................................................. A01g 19/00
[58] Field of Search ...................... 56/328, 339, 44, 50, 25.4, 56/332, 330

[56] References Cited

UNITED STATES PATENTS

| | | | |
|---|---|---|---|
| 2,900,780 | 8/1959 | Kaiser | 56/339 |
| 3,527,039 | 9/1970 | Recker | 56/328 R |
| 3,531,924 | 10/1970 | Stine | 56/328 |
| 3,555,788 | 1/1971 | Stine | 56/328 |

*Primary Examiner*—Louis G. Mancene
*Assistant Examiner*—D. L. Weinhold
*Attorney*—Howson and Howson

[57] ABSTRACT

Fruit depending from the branches of a tree is harvested by means of a perforated picker plate disposed helically about an upright post which is mounted for rotation on a ground-travelling frame. In the described forms, the picker plate is positively rotated. The plate has a plurality of shaped apertures having enlarged leading ends which are sized to permit fruit to pass downwardly and dangle below the plate and having smaller trailing ends which are sized to prevent the same fruit from passing upwardly from below the plate. The fruit is removed from its branches by means of edges at the rear of the apertures which engage between the fruit and the branches and apply tension therebetween upon rotation of the post.

16 Claims, 12 Drawing Figures

PATENTED APR 4 1972

INVENTOR:
TATUM R. COCHRAN
BY Howson & Howson
ATTYS.

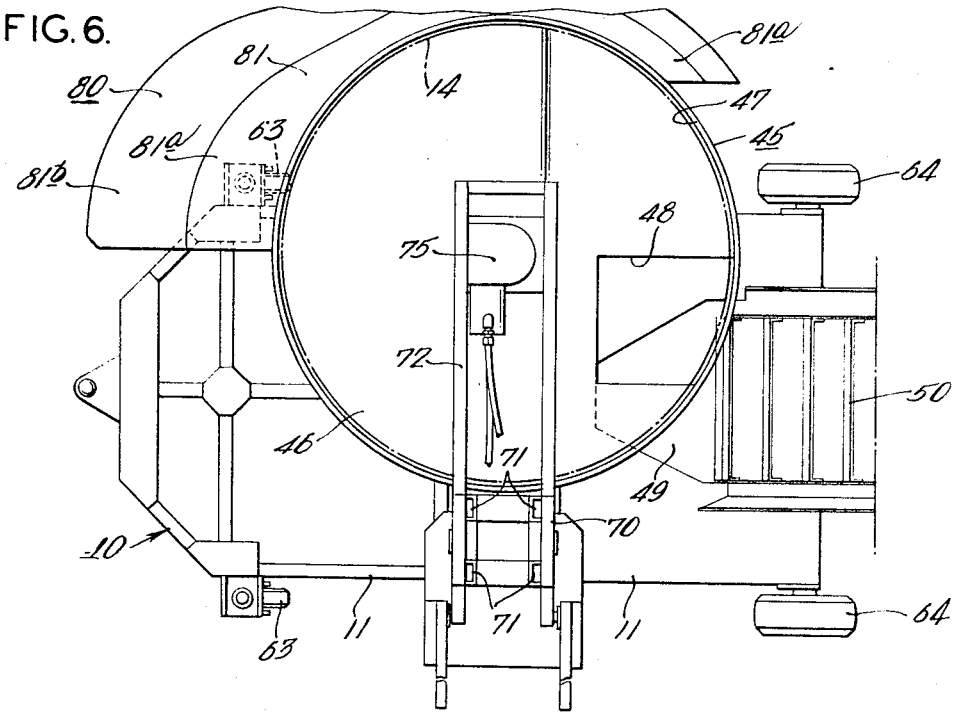
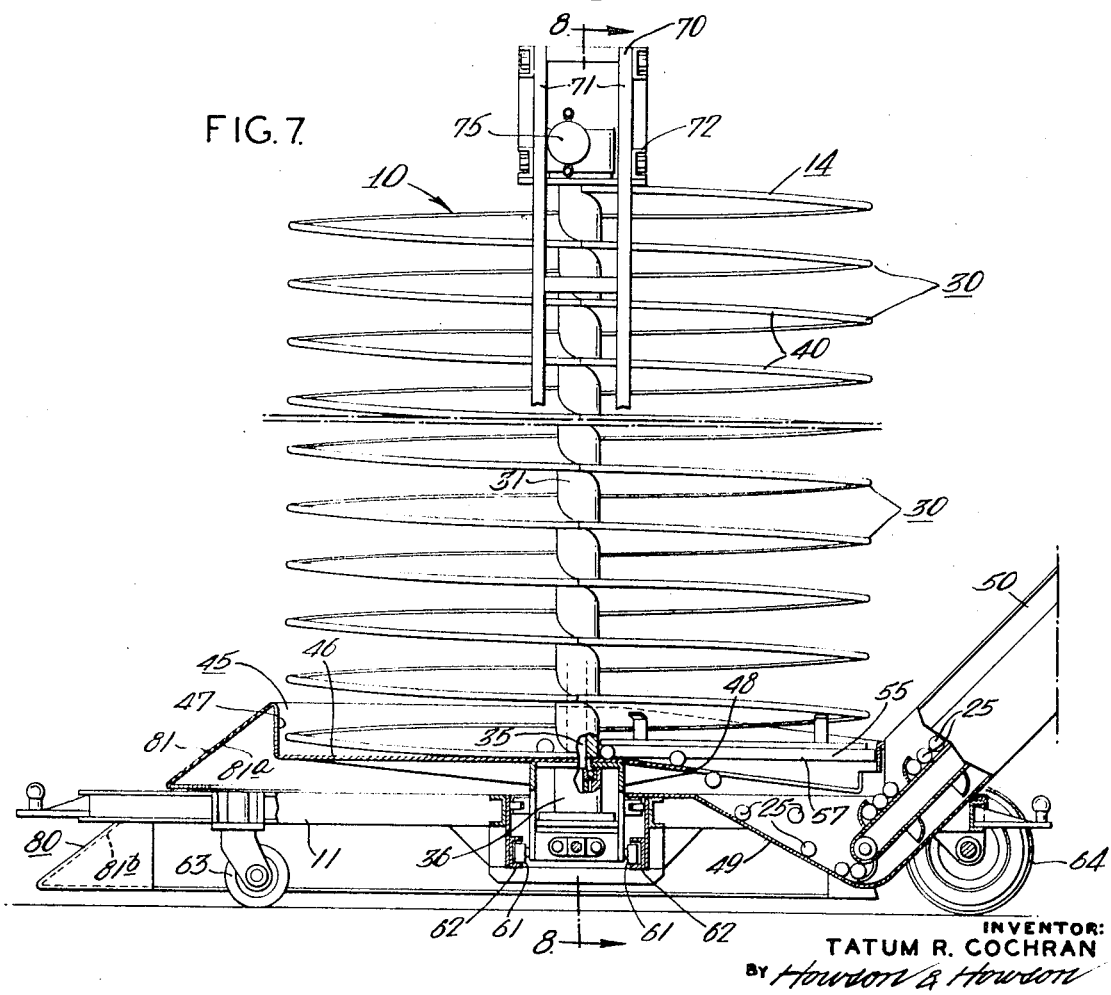

INVENTOR:
TATUM R. COCHRAN
BY Howson & Howson
ATTYS.

METHOD AND APPARATUS FOR HARVESTING FRUIT

The present invention relates to a method and apparatus for harvesting fruit and has more particular application to a method and apparatus for harvesting tree-growing fruit.

At present, a considerable amount of tree-growing fruit is harvested manually, primarily because of the lack of suitable mechanized harvesting apparatus. Equipment has been proposed for shaking trees and catching the fruit in webs of material surrounding the trunks of the trees; however, such equipment has not been entirely satisfactory, because a certain amount of manual effort is required to properly position the shaking device and the catching web, and because there exists the possibility of the fruit being damaged by falling from the top branches of the trees. Other types of apparatus having comb-like heads for engaging the branches are complex, and apparatus of this type may tend to damage the branches. Moreover, known apparatus for selecting ripened fruit and picking it is also complex.

With the foregoing in mind, it is a primary object of the present invention to provide novel apparatus for harvesting fruit with a minimum of manual labor.

It is another object of the present invention to provide improved apparatus for selecting and harvesting fruit of a predetermined size from a tree.

As another object, the present invention provides new apparatus for harvesting tree-growing fruit in a manner which avoids damaging the branches or the fruit.

As a further object, the present invention provides unique harvesting apparatus which is simple in construction and operation.

It is a still further object of the present invention to provide an improved method for harvesting tree-growing fruit.

More specifically, the present invention provides fruit harvesting apparatus comprising a ground-travelling frame which mounts a perforated picker plate disposed helically about an upright post rotatably mounted on the frame. The picker plate has means providing a plurality of shaped apertures therein, each aperture having a leading end sized to permit a piece of fruit to pass downwardly therethrough and having a trailing end sized to prevent the same piece of fruit from passing upwardly therethrough if it is mature. The fruit is separated from its branch when edge means extending across the trailing end of the aperture engages between the fruit and its branch and applies tension thereto upon rotation of the picker plate. Separated pieces of fruit are prevented from rolling off the edge of the plate by means of a peripheral rim, and the separated fruit is caught by means of a receiving basket surrounding the lower portions of the picker plate. An aperture is provided in the bottom of the basket to register with a hopper and a conveyor, and means extends outwardly from the post to sweep separated pieces of fruit toward the aperture upon rotation of the post. Deflector means cams the lower branches of the fruit tree upwardly onto the lower portion of the picker plate adjacent the basket, and means is provided to displace the plate laterally with respect to the path of movement of the frame to enable its depth of engagement with the branches to be varied.

These and other objects, features and advantages of the present invention should become apparent from the following description when taken in conjunction with the accompanying drawings in which:

FIG. 6 is an enlarged plan view of the picker machine illustrated in FIG. 1;

FIG. 7 is a vertically foreshortened side elevational view of the picker machine of FIG. 6 with portions broken away and sectioned;

Figure 1:
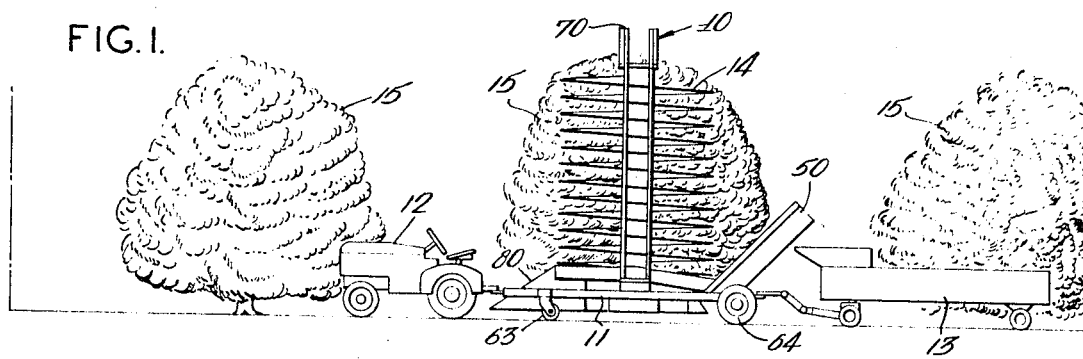
FIG. 1 is a side elevational view of harvesting apparatus embodying the present invention, the apparatus comprising a picker machine connected between a tractor and a wagon.
Figure 2:
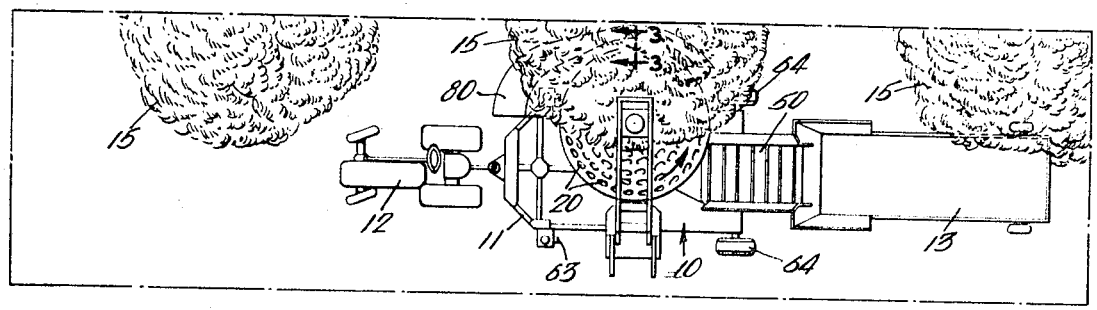
FIG. 2 is a plan view of the harvesting apparatus illustrated in FIG. 1.

Referring now to the drawings, there is illustrated in FIGS. 1 and 2 harvesting apparatus having a picker machine 10 embodying the present invention. As may be seen therein, the machine 10 comprises a mobile frame 11 which is connected intermediate a tractor 12, serving as the power plant, and a wagon 13, serving as a collector for the harvest, and which rotatably mounts an upright helically disposed perforated picker plate 14 engageable in the branches of trees 15. The picker plate 14 extends upwardly from the frame 11 a distance substantially equal to the height of trees 15, and the picker plate 14 has a radius substantially equal to the distance the branches extend outwardly from the trunk of the trees 15 to enable its periphery to be disposed close to the center thereof for picking fruit growing in such locations.

In accordance with the present invention, fruit is picked from the branches of the tree 15 by disposing a teardrop-shaped aperture with its wide end forwardly in the picker plate, permitting a piece of fruit to pass downwardly through the wide forward end of the aperture and dangle below the plate, displacing the plate forwardly relative to the branch to cause the fruit to be captured below the plate at the narrow end of the aperture, and further displacing the plate for applying tension to the connection between the fruit and the branch and and thereby separating the fruit therefrom.

Figure 3:
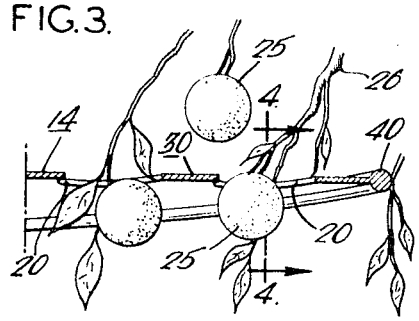
FIG. 3 is a cross-sectional view taken along line 3—3 of FIG. 2 to illustrate the operation of the present invention.
Figure 9:
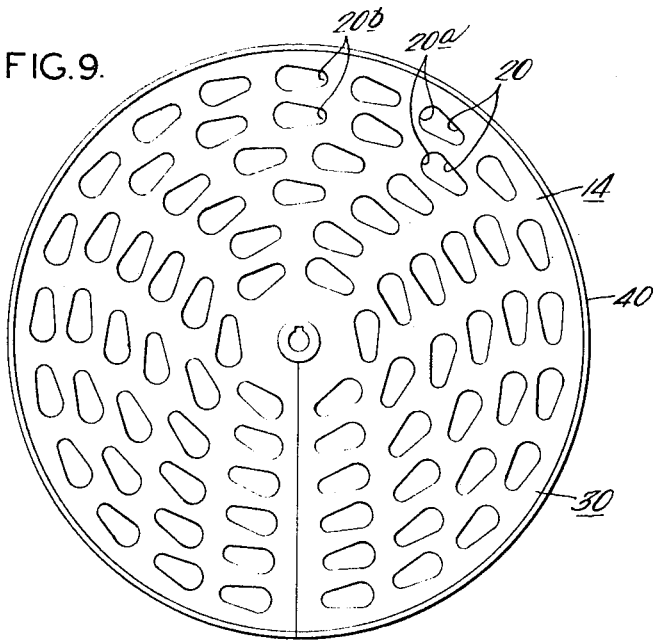
FIG. 9 is a plan view of one of the series of helical segments forming the upright picker plate on the mobile frame.
Figure 11:
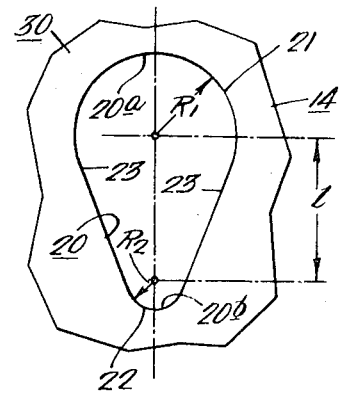
FIG. 11 is an enlarged fragmentary view of one of the apertures in the helical segments.

In order to carry out the foregoing method, means is provided to form a plurality of teardrop-shaped apertures 20,20 (FIG. 9) in the picker plate 14. In the present instance, the apertures 20,20 are spaced apart circumferentially in circles concentric with the axis of rotation of the picker plate 14 with their larger or leading ends 20a, 20a being disposed forwardly of their smaller or trailing ends 20b, 20b. As may be seen in FIG. 11, the leading end 20a of each aperture is defined by a substantially semi-circular front edge 21 having a radius of curvature $R_1$ which is larger than half the width of a piece of fruit to be picked, and the trailing end 20b of the aperture 20 is defined by arcuate edge means 22 having a radius $R_2$ which is smaller than half the width of the piece of fruit when it is sufficiently mature to be picked. The front edge 21 is connected to the rear arcuate edge means 22 by rearwardly converging and confronting side edges 23,23. In addition, the picker plate 14 is inclined to dispose the leading end 20a of each aperture 20 at a lower elevation than the trailing end 20b thereof. Thus, with this structure, a piece of fruit 25 (FIG. 3), depending from a branch 26 and having a width less than twice $R_1$, may pass downwardly through the leading end 20a of the aperture 20 (FIG. 4), but the same piece of fruit 25 may not pass upwardly through the trailing end 20b thereof (FIG. 5) if it has a width greater than twice $R_2$. As a result, the fruit 25 is captured below the plate 14 so that when the plate 14 is displaced relative to the branch 20, for example leftward in FIG. 5, the edge means 22 at the trailing end of the aperture 20 engages between the top of the fruit 25 and the branch 26 to apply tension therebetween for separating the fruit therefrom and causing it to drop as illustrated in broken lines therein.

Figure 4:
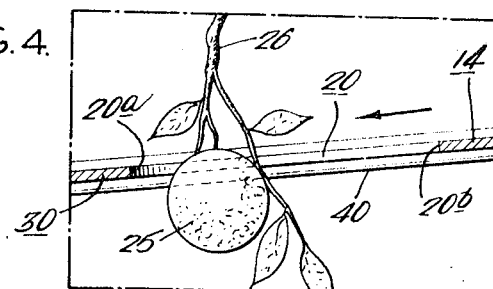
FIG. 4 is an enlarged fragmentary view taken along line 4—4 of FIG. 3 to illustrate a branch and a piece of fruit disposed in the leading end of an aperture in the picker plate.
Figure 5:
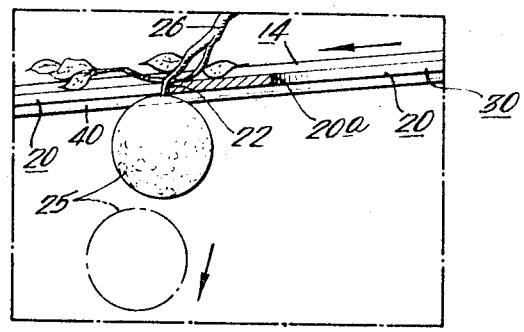
FIG. 5 is a view similar to FIG. 4 but illustrating the fruit caught below the plate in the trailing end of the aperture with the rear edge of the plate engaging between the fruit and the branch to separate the fruit.

In addition to picking fruit of a predetermined size, the apparatus of the present invention permits fruit of a smaller size to remain on the tree, thereby performing a selecting operation. For example, fruit resulting from later blossoms having a width less than twice $R_2$ and which is not mature enough to be picked by the apparatus is permitted to pass upwardly through the apertures 20,20 without being captured below the picker plate 14. Also, branches pulled downwardly through the apertures 20,20 by the weight of the fruit, as illustrated in FIG. 4, are able to pass upwardly through the apertures 20,20 without being damaged or being stripped of their leaves.

The type and size of the fruit being harvested determines the preferred dimensions of the apertures. For example, in order to pick mature, juicing oranges the radius $R_1$ is typically 3 inches, the radius $R_2$ is typically 1 inch, and the length L between centers of the radii is typically 8 inches. Corresponding dimensions for grapefruits are 4½ inches, 1½ inches and 8 inches, respectively; and for lemons, dimensions of 2½ inches, ¾ inch, and 6¾ inches are preferred. $R_1$ should be selected in relation to the smallest size of mature fruit to be harvested and $R_1$ is preferably at least three times $R_2$ to prevent rejection of oversized fruit. When harvesting food products other than fruit, however, different dimensions may be preferable, although the aforementioned relationship between $R_1$ and $R_2$ and the width of the food product should be maintained for the apparatus to operate satisfactorily.

Figure 10:
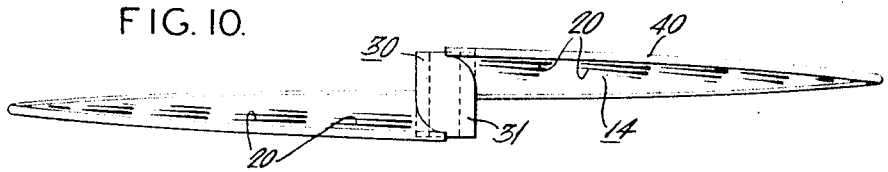
FIG. 10 is a side elevational view of the segments illustrated in FIG. 9.

In order to enable the apparatus 10 to harvest fruit of various types and sizes, the picker plate 14 is formed of individual helical segments, for example the segment 30 (FIGS. 9 and 10) which is preferably of molded aluminum and which is stacked end-to-end with like segments 30,30 on a rotatable upright post 35 (FIG. 7) to provide a continuous upward helix. Each plate 30 has a hub 31 with a through bore sized to enable the plates 30,30 to be slid vertically into position on the post 35. In the illustrated embodiment, each plate 30 is locked onto the post 35 by means of a conventional keyed connection, and the bottom end of the post 35 is mounted for rotation on the frame 11 by means of a bearing 36. Thus, upon rotation of the post 35, the plates 30,30 are displaced through the branches of the tree 15 to pick fruit therefrom.

When the fruit is separated by the upper segments 30,30, it falls downwardly through the apertures onto the lower segments 30,30, and then follow the helix downwardly. In addition, there is a tendency for the severed fruit to roll radially outward of the plates 30,30 and thereby fall from their edges. In order to eliminate this tendency, means is provided to form an upstanding rim 40 (FIG. 3) on the periphery of each plate 30. In the present instance, the rim 40 is a round rod welded onto the peripheral edge of the plate; however, it may be desirable for the rim 40 to be molded integral with the plate 30. Thus, with this structure, severed fruit is prevented from falling from the edges of the plates 30,30 while being conveyed downwardly along the helix.

The severed fruit may drop through the apertures from plate to plate as it travels downwardly through the picker plate 14. In order to marshall the severed fruit at the bottom of the picker plate 14, a receiver 45 is provided. As may be seen in FIGS. 7 and 9, the receiver 45 comprises a basket having a substantially circular bottom member 46 mounting an upstanding peripheral wall 47 surrounding the lower periphery of the picker plate 14. In the illustrated embodiment, the bottom member 46 slopes rearwardly and has an aperture 48 therein which registers with an underlying hopper 49 for loading conveyor means 50 carried at the rear end of the frame 11 and rotated by a hydraulic motor (not shown). Thus, fruit falling through the aperture 48 enters the hopper 49 and is conveyed upwardly and rearwardly by the conveyor means 50 to be loaded into the collector wagon 13.

The severed fruit which falls into the forward portion of the receiver 45 must be displaced rearwardly toward the aperture 48. To this end, sweeping means 55 is provided to extend outwardly from the hub 31 of the bottom plate segment 30 and terminate adjacent the wall 47 for sweeping the fruit toward the aperture upon rotation of the post 35. In the illustrated embodiment, the sweeping means 55 includes the upstanding leading edge 56 of the bottom plate segment 30; however, if desired, a flat, elongated arm 57 may be mounted on the hub 31 to provide an increased sweeping action.

Figure 8:
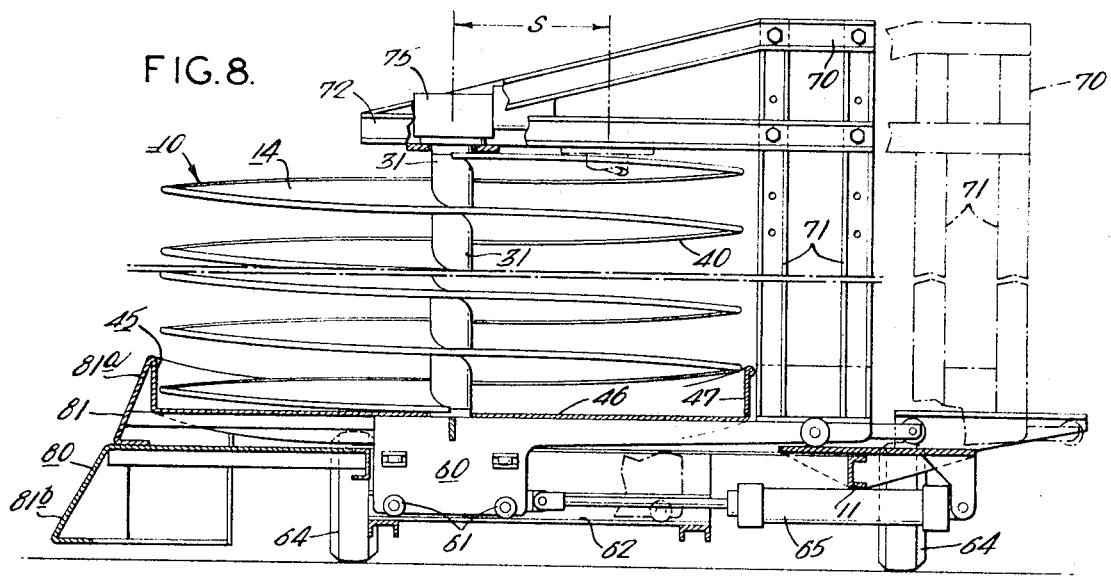
FIG. 8 is a vertically foreshortened sectional view as seen from the line 8—8 in FIG. 7.

Fruit trees, and particularly orange trees, are normally planted in rows as illustrated in FIG. 1, and the picker machine 10 is designed to move along the rows with the picker plate 14 engaging the branches. Depending on the density of the fruit and like factors, it may be desirable to vary the depth of engagement of the picker plate 14 with the branches. For this purpose, the post 35 is mounted for rotation on a platform or carriage 60 which is mounted on the frame 11 for displacement laterally to its path of movement. As may be seen in FIGS. 7 and 8, the carriage 60 has rollers 61,61 engaging tracks 62,62 underlying the frame 11 intermediate its castering front wheels 63,63 and its rear wheels 64,64. Means is connected between the carriage 60 and the frame 11 to displace the carriage leftward a selected distance into the full line limit position illustrated in FIG. 8 or rightward into the broken line limit position illustrated therein. In the present instance, the displacing means comprises a hydraulic actuator 65 coupled by suitable means to an operating valve on the tractor 12. With this structure, the tractor operator may readily vary the depth of engagement of the picker plate 14 with the tree branches by manipulating the operating valve.

The picker plate 14 extends upwardly for a distance which may exceed fourteen feet to enable it to pick fruit growing near the tops of the trees. As a result, when the picker plate 14 rotates, there may be a tendency for its upper end to move or sway laterally. In order to obviate this tendency, means is provided to rotatably mount the top end of the post 35. This is effected in the present invention by an upstanding boom 70 fabricated of channel members 71,71 (FIG. 8) mounted on the carriage 60 to move with the picker plate 14. The upper end of the boom 70 mounts a laterally extending arm 72 which, in the present instance, is bolted to the boom 70 to enable the plate segments 30,30 to be readily removed and replaced.

The upper end of the post 35 is rotatably mounted by means of bearings mounted in a housing 75 carried adjacent the end of the arm 72, and, in the illustrated embodiment, drive means for positively rotating the post 35 is also provided in the housing 75. In the present invention, it is preferable for the post 35 to be rotated by a hydraulic motor mounted in the housing 75, which motor preferably possesses variable-speed control. The hydraulic fluid for the motor, like the hydraulic actuator fluid, is preferably supplied by a hydraulic system on the tractor 12 through valves mounted convenient to the operator. Thus, with this structure, the depth of engagement as well as the rate of rotation of the picker plate may be varied by the tractor operator.

The lower branches of some fruit trees droop toward the ground when laden with mature fruit. In order to enable the harvester of the present invention to pick fruit on the lower branches, deflector means 80 is provided on the frame to cam the branches upwardly onto the lower segments of the picker plate 14. As may be seen in FIG. 6, the deflector means comprises a two-piece skirt 81 sloping forwardly and laterally downward toward the ground from the rim of the wall 47 of the receiver 45. In the illustrated embodiment, the skirt 81 has an upper portion 81a which moves laterally with the picker plate 14 and receiver 45, and the skirt 81 has a lower portion 81b which is fixedly mounted on the frame 11. With this structure, the lower branches of the tree 15 are cammed upwardly onto the bottom segment of the picker plate 14 as the frame 11 advances along the ground so that fruit on these branches is harvested upon rotation of the picker plate 14. The division of the skirt structure 81 into two portions ensures a camming action irrespective of the lateral location of the carriage 60 and hence the picker plate 14.

In operation, the picker machine 10 is advanced slowly forward on the ground with the picker plate 14 rotating at a relatively slow velocity, preferably less than 20 r.p.m.s. and the conveyor means 50 operating. The tractor 12 is positioned to cause the deflector means 80 to engage under the lower branches of the tree 15 and cam the branches into the lower portion of the picker plate 14. Rotation of the picker plate 14 in the counterclockwise direction (FIG. 2) causes the fruit to be picked from the branches and to fall downwardly through the apertures 20,20 in the plate segments 30,30 and into the basket means 45. The sweeping means 55 displaces the severed fruit across the bottom 46 of the basket 47 to load it into the hopper 49 of the conveyor means 50 which scoops up the fruit and loads it onto the wagon 13 trailing the picker machine 10. If desired, the tractor operator may increase or decrease the depth of engagement of the picker plate 14 by actuating the hydraulic actuator 65, or the rate of rotation may also be varied depending on conditions. The fruit in the row of trees, 15,15 is harvested by steering the tractor 12 in a sinuous path in the rows alongside opposite sides of the trees. In this embodiment of the invention the tractor serves as a power plant, not only for advancing the picking machine along the rows, but also for supplying hydraulic fluid for operating the driven mechanisms of the machine.

Figure 12:
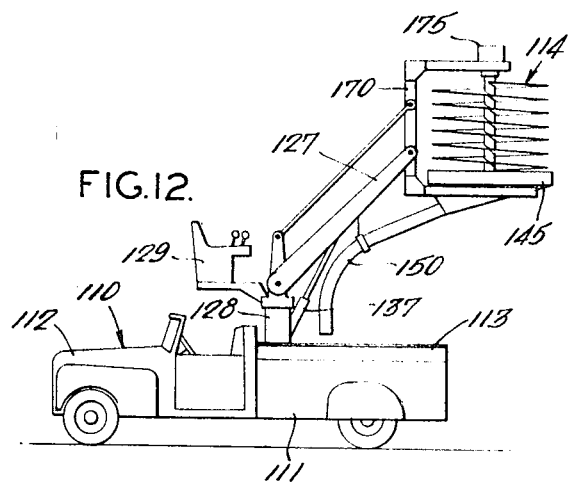
FIG. 12 (Sheet 1) is a view of a modified embodiment of the present invention.

In a modified embodiment of the present invention, a self-propelled harvester 110 (FIG. 12, Sheet 1) is provided to pick fruit growing near the tops of the trees 15 or growing at other locations which are not readily accessible by the trailed picker machine 10. For this purpose, the harvester 110 comprises a mobile frame which has a self-contained power plant and collector, for example a small truck 111 having a power plant at 112 and a collector at 113, and which has a rotary picker plate 114 mounted for rotation on a vertical axis spaced from a boom 170 at the end of a carriage assembly 127. As may be seen in FIG. 12, the carriage assembly 127, and a chair 129 for an operator, is mounted for rotation on an upstanding post 128 on the truck 111. Although not specifically illustrated, means is provided within the post to rotate the carriage assembly 127 on the post 128 and means, in the illustrated embodiment a hydraulic cylinder 137, is provided to adjust the vertical position of the picker plate 114. The picker plate 114 is rotated by means of a hydraulic motor 175. A receiver 145 is mounted on the carriage assembly 127 and surrounds the base of the picker plate 114 to receive separated fruit, and a hollow conveying tube 150 is connected to the bottom of the receiver means 145 to convey separated fruit downwardly into the body 113 of the truck 111. The modified harvester 110 operates like the first-mentioned harvester 10 to pick fruit from the branches of the trees 15; however, a greater degree of location control is provided for the picker plate 114.

In view of the foregoing, it should be apparent that novel apparatus has been provided for harvesting fruit in a manner which requires a minimum of manual labor and which picks fruit without damaging it or injuring the branches on which the fruit grows.

While preferred embodiments of the present invention have been described in detail, various modifications, alterations or changes may be made without departing from the spirit and scope of the present invention as defined in the appended claims.

What is claimed is:

1. Apparatus for harvesting fruit depending from branches, comprising:
    a mobile frame,
    an inclined plate carried on said frame, said plate being disposed in the form of a helix around an upright axis,
    means for rotating said plate about said axis and relative to said branches,
    means providing a plurality of shaped apertures in said plate with each aperture having an enlarged leading portion sized to permit passage of one of said fruit in a direction from one side of said plate to the other side thereof for dangling adjacent to said other side, each aperture also having a trailing portion sized to prevent passage of said one fruit in an opposite direction through said aperture, said apertures being located in said plate with their leading portions at an elevation lower than their trailing portions,
    means for applying tension between said fruit and its branch to effect separation of said fruit from said branch upon rotation of said plate, said tension applying means being located in the plane of the plate, and
    receiver means underlying said plate to receive fruit severed from the branches, whereby the fruit is harvested from the branches.

2. Apparatus according to claim 1 wherein said fruit is substantially round and the leading portion of each aperture is formed by an arcuate end edge having a radius greater than the radius of the fruit to be picked, said trailing portion is formed by confronting side edges extending rearwardly from said arcuate edge and terminating in a transverse edge interconnecting said side edges at the trailing end of each aperture.

3. Apparatus according to claim 2 wherein said side edges converge rearwardly from the widest part of said arcuate leading edge and said transverse edge is arcuate between said side edges and is tangent thereto.

4. Apparatus according to claim 1 wherein said plate rotating means includes an upstanding post rotatably carried on said frame, means to lock said plate to said post, and means to rotate said post whereby the plate is displaced through the branches upon rotation of the post.

5. Apparatus according to claim 4 wherein said plate has a circular outline concentric with said post and said apertures are disposed in circumferentially spaced relation in circles concentric with the axis of rotation of said post.

6. Apparatus according to claim 4 wherein said plate includes a series of helical segments mounted on said post axially on one another, and means providing an upstanding rim around the periphery of said segments so that fruit separated from the branches by the segments is prevented from rolling off the periphery of the plate.

7. Apparatus according to claim 4 wherein said receiver means includes a substantially circular bottom member having an upstanding peripheral wall spaced from the lower portion of said post, an aperture in said bottom member, a hopper in registry with said bottom aperture, and sweeper means extending outwardly from said post and terminating adjacent said wall to engage separated fruit for displacing them across said bottom and into said hopper upon rotation of said post.

8. Apparatus according to claim 7 wherein said plate tapers toward said bottom wall and said sweeper means includes an upstanding leading edge on said plate extending outwardly from said post.

9. Apparatus according to claim 7 wherein said sweeper means includes an arm extending outwardly from said post.

10. Apparatus according to claim 1 including deflector means carried on said frame, said deflector means sloping forwardly and downwardly from said receiver means to engage the underside of the branches for camming them upwardly to operatively engage the lower portion of the plate.

11. Apparatus according to claim 1 including power plant to move said frame in a selected path, a carriage mounted on said frame for displacement outwardly in a direction transverse to the path of movement of the frame, means connected between said frame and said carriage to displace said carriage outwardly, a plate mounting means carried on said carriage, so that the operating position of the plate may be adjusted with respect to the frame.

12. Apparatus according to claim 11 wherein said plate mounting means includes a post mounted for rotation on an axis upright with respect to said carriage, bearing means rotatably mounting said post on said carriage, an upstanding boom mounted on said carriage a spaced distance from said post, an arm extending laterally outward from the top of said boom and terminating adjacent the top of said post, and means rotatably mounting the top of said post to said arm whereby a rigid movable structure is provided.

13. Apparatus according to claim 12 including a hydraulic motor carried on said arm and coupled to the top of said post to impart rotation thereto.

14. Apparatus according to claim 1 including conveyor means mounted on said frame adjacent said receiver means to unload separated fruit received therein.

15. A method of harvesting fruit depending from branches, comprising the steps of:
engaging against the branches an inclined helical plate having a plurality of apertures therein, each aperture having a leading end sized to permit passage of one the fruit, the plate being inclined to dispose the leading ends of the apertures at an elevation lower than the trailing ends,
permitting the fruit to pass through the leading ends of the apertures,
rotating the plate on an upright axis with respect to the branches to cause the fruit to move rearwardly and underlie the plate at the trailing ends of the apertures and to cause the plate to engage between the fruit and their branches for applying tension therebetween and effecting separation of the fruit, and
receiving and collecting fruit separated from the branches.

16. A method according to claim 15 including the steps of disposing a receiver having an aperture in its bottom below said apertures to receive separated fruit falling from said apertures, sweeping the separated fruit toward said aperture and conveying the separated fruit away from the aperture to a remote collector.

* * * * *